(12) United States Patent
Yi

(10) Patent No.: US 6,870,923 B2
(45) Date of Patent: Mar. 22, 2005

(54) METHOD FOR TRANSFERRING MESSAGE IN A MESSAGE TRANSFER PART WITH HIGH SPEED

(75) Inventor: Seung-hee Yi, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 732 days.

(21) Appl. No.: 09/952,031

(22) Filed: Sep. 14, 2001

(65) Prior Publication Data
US 2002/0057787 A1 May 16, 2002

(30) Foreign Application Priority Data
Sep. 15, 2000 (KR) .......................................... 2000-54233

(51) Int. Cl.⁷ ................................................. H04M 7/00
(52) U.S. Cl. .................... 379/230; 379/219; 379/221.01
(58) Field of Search .................................. 379/230, 219, 379/221.01

(56) References Cited

U.S. PATENT DOCUMENTS

| 5,661,782 A | * | 8/1997 | Bartholomew et al. | .. 379/88.18 |
| 5,708,702 A | * | 1/1998 | De Paul et al. | ............. 379/230 |
| 6,175,574 B1 | * | 1/2001 | Lewis | ........................ 370/522 |

* cited by examiner

Primary Examiner—Creighton Smith
(74) Attorney, Agent, or Firm—Fleshner & Kim, LLP

(57) ABSTRACT

A method for transferring a message in a message transfer part with high speed is disclosed. Distinctive features of the invention include the generation of an access key table that stores information regarding the status of a destination point, to which a message is intended to be sent, and the transmission of the message pursuant to the status of the destination point contained in the access key table.

20 Claims, 7 Drawing Sheets

METHOD FOR TRANSFERRING MESSAGE IN A MESSAGE TRANSFER PART WITH HIGH SPEED

BACKGROUND OF THE INVENTION

1. Field of the Invention

The present invention relates to a method for transferring a message in a Message Transfer Part (MTP) with high speed. More particularly, the invention relates to the method for registering an access key for a destination point of the MTP and transferring the message with the access key, when the MTP user part requests to transmit the message to the MTP.

2. Background of the Related Art

Generally, a No. 7 signaling method is a standardized common channel signaling system under the International Telecommunications Union, Standard Part (ITU-T). The No. 7 signaling method is a signaling method for transmitting various control signals in order to provide subscriber connections and various communication services or to operate and manage communication networks. As shown in FIG. 1, a No. 7 signaling network is composed of a Message Transfer Part (MTP), a Signaling Connection Control Part (SCCP), an ISDN User Part (ISUP), a Transaction Capabilities Part (TCAP), a Telephone User Part (TUP), and other user parts (not shown in FIG. 1) of mobile communication intelligent networks. The MTP performs transmission control and error correction of signals communicated over the signaling networks. The ISUP is designed differently according to the application field of the telephone exchange and the data exchange.

The MTP acts as the communicator of the signals sent and received at the signal point of the No. 7 signaling network. As shown in FIG. 2, the MTP is composed of a signal message handling module (20) and a signal network management module (10). The signal message discrimination, routing and distribution functions are performed by the signaling message handling module (20). The signal message network management module (10) controls and assures the efficient use of all parts relevant to the transmission of a credible message including signal link, signal point, and the signal route management. It also maintains the uniformity of all signal network parts and manages the signal network information.

Apart from the communication line designated for voice or data transmission, a separate signal line is used for sending and receiving control signals in a No. 7 signaling system. Therefore, the speed of handling signals is dramatically improved. Furthermore, multiple call related signals can be bundled into one signal unit. The length of each signal may be varied according to the transmitted data.

The MTP communication method is explained in the American No. 7 signal standard (ANSIT1.111) and ITU Q70x recommendations. The two recommendations are only different as to specific details and are otherwise generally similar to each other.

FIG. 3 shows the generally used No. 7 signaling method of MTP as specified in the two recommendations and the structure of the MTP user part protocol. FIG. 4 shows the structure of level 3 of the general MTP protocol.

As shown in FIG. 3, the generally used No. 7 signaling method of the MTP and the structure of the MTP user part protocol include: a telephone user part (31), an ISDN user part (32), a transaction user part (33), a signal connection control part (34), and a message transmission part (35). The MTP is comprised of three levels. The telephone user part (31), ISDN user part (32), and signal connection control part (34) comprise the user part of the MTP, as shown in FIG. 1. The transaction user part (33) is a part of the signal connection control part of the user part.

The previous method of message transfer at the user part of the MTP is as follows. When a message routing is requested from the MTP user part to the MTP, the message routing part (43), shown in FIG. 4, receives the request and checks the feasibility of such routing based on the information contained in the signal message routing label. If such routing is found to be feasible, the message routing part (43) sends a signal message to the signal network (44). If the requested routing is not feasible, the message routing part (43) disposes the signal message. In FIG. 4, the message discrimination part (42) plays the role of determining the destination point of the signal sent through the signal network by the MTP user part. The message distribution part (41) distributes the located signals to the users.

Table 1, below, shows the required primitive parameters of the MTP for signal message routing at the MTP user part.

TABLE 1

| DPC | OPC | SLS | SIO | DATA |
| --- | --- | --- | --- | --- |
| Destination Point Code | Originating Point Code | Signal Link Selection | Service Information Octet | Transmission Data |

When the No. 7 user part requests a message delivery to the MTP, the process of determining whether such a delivery is possible is as follows. First, the routing label information is gathered. FIG. 5 shows the composition of the routing label information among the MTP headers. The routing label information consists of header information, which divides the information header part and the subordinate part, the originating point code, and the destination point code. After gathering the routing label information, the accuracy of the signal point information and existence of the destination signal point are checked based on the gathered label information.

The process of checking for feasibility of routing is performed every time the MTP user part requests the MTP to transmit a message. Furthermore, such feasibility check requires that the existence of a destination point and the accessibility to the destination signal point be ascertained by searching through the memory and data base system.

The previous No. 7 signaling message transfer method poses the following problem. Every time the MTP user part sends a signal message to a destination signal point, the checking process stated above must be performed. Furthermore, the existence of a signal point and its accessibility must be checked by searching through an enormous amount of data saved in the memory. This is a time-consuming process. In addition, the time for routing the signal point may vary according to each signal point. Therefore, the traditional method will lower the efficiency in the processing of MTP signal messages.

The above references are incorporated by reference herein where appropriate for appropriate teachings of additional or alternative details, features and/or technical background.

SUMMARY OF THE INVENTION

An object of the invention is to solve at least the above problems and/or advantages and to provide at least the advantages described hereinafter.

The present invention seeks to solve the problem pertaining to the previous technology. It attempts to simplify the procedures with regard to the routing of the signal message from the MTP to the signal network. As a result, the present invention endeavors to improve the No. 7 signal message processing ability by enabling high-speed processing of the signal messages and augmenting the transmission of messages per time unit.

In order to attain the objectives stated above, the present invention suggests a method that enables the high-speed transmission of MTP signal messages by creating an access key table. The status information of a destination point is saved into the access key table. The unique feature of the present invention can be said to be the part relating to the transmission of messages according to the status of the destination point recorded in the access key table.

The transmission of messages through the above access key is accomplished through the following steps: (a) a step for recording the status information of the destination point to which the message is to be sent from the MTP; and (b) a step for actually sending the message to the destination point. In transmitting the message, step (b) includes a process for searching for the access key information registered in step (a) and a process for determining the accessibility to the destination point. Additionally, the invention includes a step for releasing the registered access key in the table.

The registration or the release of an access key is achieved by defining the MTP access key request primitive and then sending it from the MTP user part to the MTP. The message delivery request in step (b), above, is accomplished by defining the MTP access primitive and sending it from the MTP user part to the MTP. When registering or releasing an access key in the table mentioned above, there is an additional step of notifying the MTP user part of the action.

The notification of the above registration or release is done by defining an MTP access key confirmation primitive and sending it from the MTP to the MTP user part.

The MTP access request primitive includes information regarding the originating point, destination point, service information, information as to whether there was a registration or a release, information as to whether the request was successfully performed, and, in case of failure, information on the reason for such failure. The MTP access transfer primitive includes information on the access key and the user data. The MTP access confirmation primitive includes information regarding the originating point, destination point, service information, information as to whether there was a registration or a release, information as to whether the request was successfully performed, and, in case of failure, information on the reason for such failure.

The table in which the access key is recorded includes an index field, destination point field, originating point field, service information field, and a field indicating the status of the destination point. The table in which the access key is recorded uses the access key as a hashing index. The destination point of the table where the above access key is recorded becomes automatically renewed by the MTP signal network management part.

The objects of the invention may be achieved in whole or in part by a method of transferring a message in a Message Transfer Part (MTP). The method including: (a) defining an MTP access key request primitive regarding registration or release of an MTP access key, an MTP access key confirm primitive regarding confirmation of the registration or release of the MTP access key, and an MTP access key transfer primitive that sends the message; (b) sending a first signal requesting an access key registration from an MTP user part to a destination point, using the MTP access key primitive; (c) sending a second signal requesting transmission of the message to the MTP, using the MTP access key transfer primitive to transmit the message to the destination point registered in the corresponding access key; (d) determining the accessibility of the destination point using access key information contained in the MTP access key transfer primitive to locate status information corresponding to the destination point within the access key table; and (e) routing the message to a signal network for subsequent transmission to the destination point, when the destination point is accessible.

The objects of the invention may be further achieved in whole or in part by a method of transferring a message in a message transfer part (MTP), including receiving an MTP access key transfer primitive that contains an access key identifier of a destination point; determining the accessibility of the destination point using the access key identifier to locate status information corresponding to the destination point within an access key table that has a separate access key for each of a number of registered destination points; and sending the message to the destination point if the destination point is accessible.

The objects of the invention may be further achieved in whole or in part by a message transfer part (MTP) access primitive, including a destination point code field that identifies an address of a message destination point; an originating point code field that identifies the address of a message origination point; a service information field that identifies service information related to a message; an operation register and release field that identifies an operation to register or release an access key in an access key table; an access key field that identifies the access key in the access key table; and a reason field that identifies the success or failure of registering or releasing the access key and a reason for the failure to register or release the access key, if the failure occurs.

The objects of the invention may be further achieved in whole or in part by a message transfer part (MTP) access transfer primitive, including an access key field that identifies an access key within an access key table; and a data field containing data for transfer to a destination point, wherein an address of the destination point is contained within the access key corresponding to the destination point.

The objects of the invention may be further achieved in whole or in part by an access key table of a message transfer part (MTP) having a number of registered access keys, each registered access key uniquely identifying a destination point for a message and including an access key field that uniquely identifies the access key; a destination point code field that identifies an address of the destination point; an originating point code field that identifies the address of a message origination point; a service information field that identifies service information related to the destination point; and a destination status field that identifies whether the destination point is available to receive the message.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings.

Table 2 shows the structure of the access key table. The data fields in the preferred embodiment of the table are "AK," "DPC," "OPC," "SIO," and "STATUS."

TABLE 2

| AK | DPC | OPC | SIO | STATUS |
|---|---|---|---|---|
| Access Key Index | Destination Point Code | Originating Point Code | Service Information Octet | Destination Point Status |

"AK" refers to the access key. When defining multiple access keys, "AK" refers to the index that distinguishes each access key.

"DPC" and "OPC" refer to the destination and originating signal point, respectively. Access keys are defined differently depending on the values of the DPC and OPC.

"SIO" is the part that distinguishes the user part and it is further divided into more specific fields.

"STATUS" is the information indicating whether it is possible to use a particular signal point. When there is an error with the signal point, the destination signal point sends a message indicating the existence of such error to the applicable signal point. The applicable signal point receiving such error message will change the value of the "STATUS" field. In addition, when it is not possible to send an error message from the destination signal point, due to a physical error, the originating signal point is able to recognize such physical error and change the "STATUS" value.

When sending a message, instead of checking for the existence of a destination signal point and its availability, the transmission is completed by a simple reference to the destination point status information contained in the access key table. Consequently, the messages can be sent at a much faster speed than the traditional method.

Figure 8:
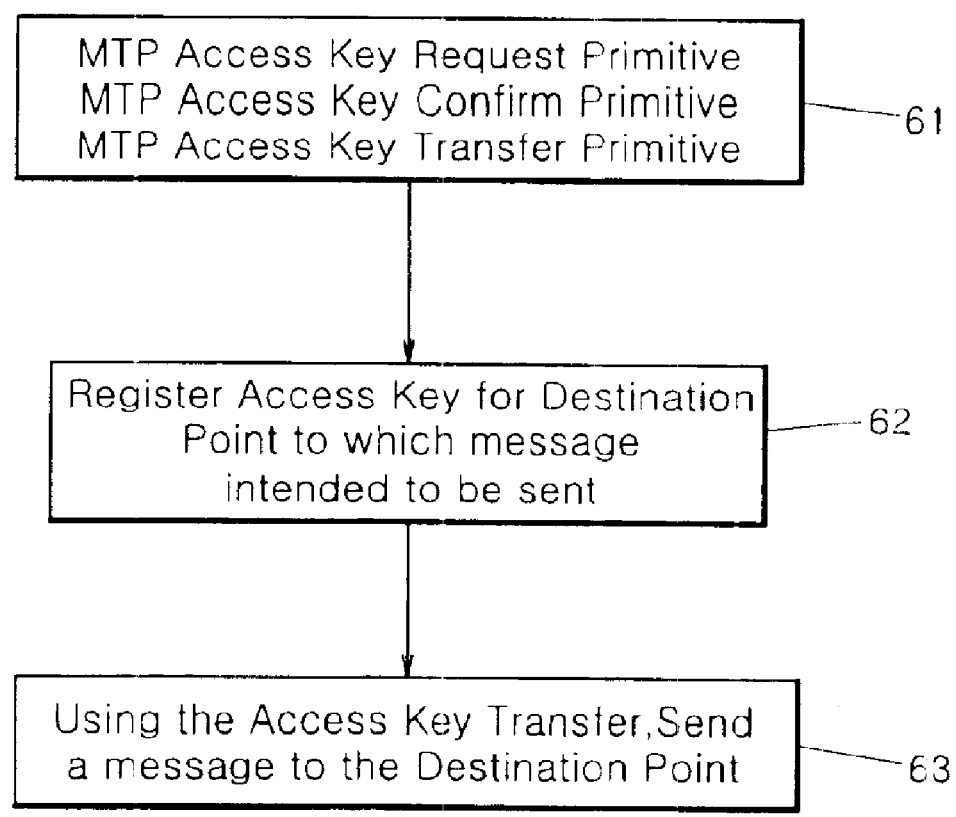
FIG. 8 illustrates a flow chart of the high-speed MTP signal message transmission method according to the preferred embodiment of the present invention.

FIG. 8 shows the flow chart of the high-speed MTP signal message transmission method according to the preferred embodiment of the present invention. The MTP access key request primitive, MTP access confirm primitive, and MTP access transfer primitive are defined first (61). A primitive refers to the exchange of information between mutually distinctive blocks within the same system. The MTP access request primitive defines items relating to the registration and release requests of the MTP access key. It is used when a registration or release of the MTP access key is requested from the MTP user part to the MTP. The MTP access key confirm primitive defines items relating to the confirmation of MTP access key registration or release. It is used when the MTP notifies to the MTP user part whether the access key has been registered or released. The MTP access key transfer primitive defines items relating to the transmission of signal messages. It is used when requesting a transmission of signals from the MTP user part to the MTP.

Table 3 provides an example of an MTP access key request primitive and confirm primitive that have been defined. "DPC" and "OPC" refer to the signal point regarding the destination point and the originating point, respectively. Each signal point of a No. 7 signal network is represented by 14 bits and has a unique value.

TABLE 3

| Name | | | Parameter |
|---|---|---|---|
| Request | DPC | 14 Bit | Destination Point Code |
| | OPC | 14 Bit | Originating Point Code |
| | SIO | 8 Bit | Service Information Octet |
| | OPR | 8 Bit | Operation (Register/Release) |
| | AK | 8 Bit | Access Key |
| | RSN | 8 Bit | Reason |
| Confirmation | DPC | 14 Bit | Destination Point Code |
| | OPC | 14 Bit | Originating Point Code |
| | SIO | 8 Bit | Service Information Octet |
| | OPR | 8 Bit | Operation (Register/Release) |
| | AK | 8 Bit | Access Key |
| | RSN | 8 Bit | Reason |

"SIO" is the Service Information Octet that distinguishes the MTP user part and is made up of detailed fields.

"AK" is the Access Key used for requesting signal message routing to the signal point.

"RSN" is the Reason field that shows whether a request for a creation of an access key was successfully performed or not and, in the event of failure, it shows the reason for such failure.

Table 4 shows an example of an MTP access transfer primitive that has been defined. "AK" is the access key value confirmed from the MTP access key confirm primitive and "DATA" refers to the data from the MTP user part intended to be sent to the signal network.

TABLE 4

| Name | | Parameter | |
|---|---|---|---|
| Request | AK | 8 Bit | Access Key |
| | DATA | 8 Bit(250) | User Data |

After defining the MTP access key request primitive, confirm primitive, and the access transfer request primitive, an access key with respect to the applicable destination point is registered (62). This registration enables a message to be sent from the MTP user part to the destination (63).

Figure 1:
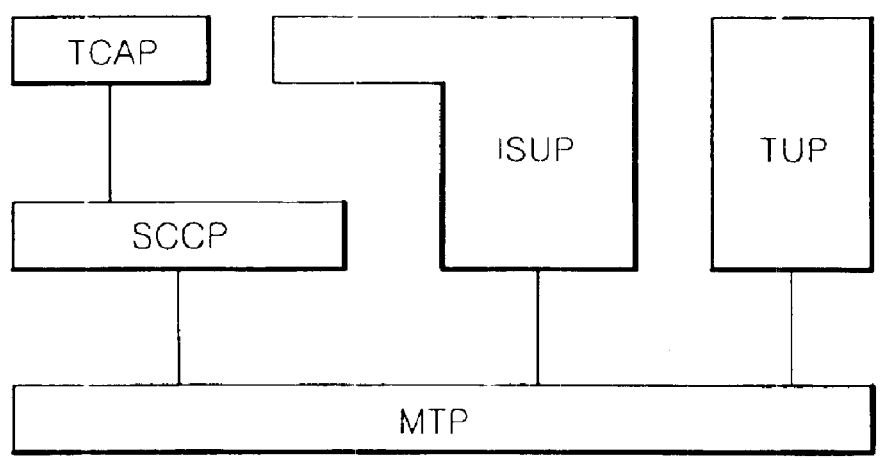
FIG. 1 illustrates the structure of a No. 7 signal network.
Figure 2:
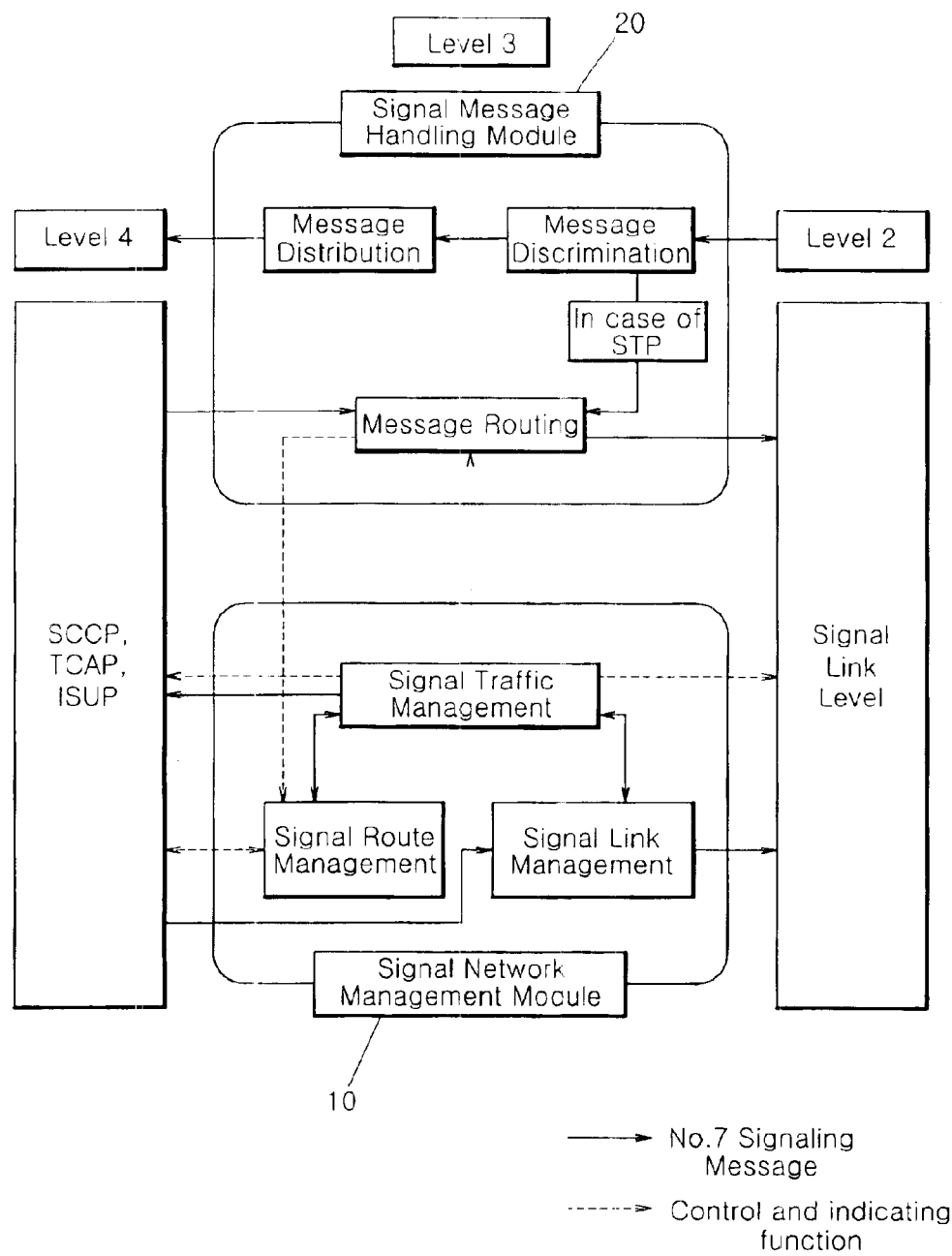
FIG. 2 illustrates the composition of the MTP.
Figure 3:
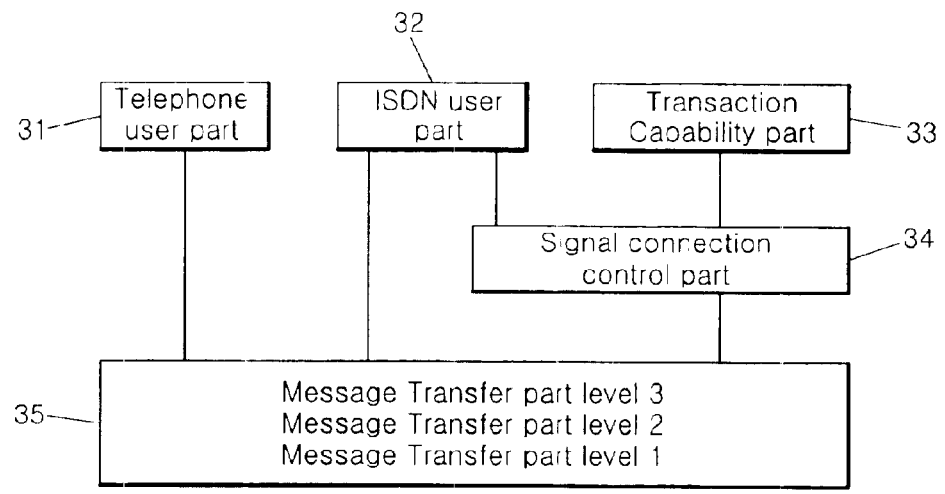
FIG. 3 illustrates the MTP of the general No. 7 signaling method and the structure of the MTP user part protocol.
Figure 4:
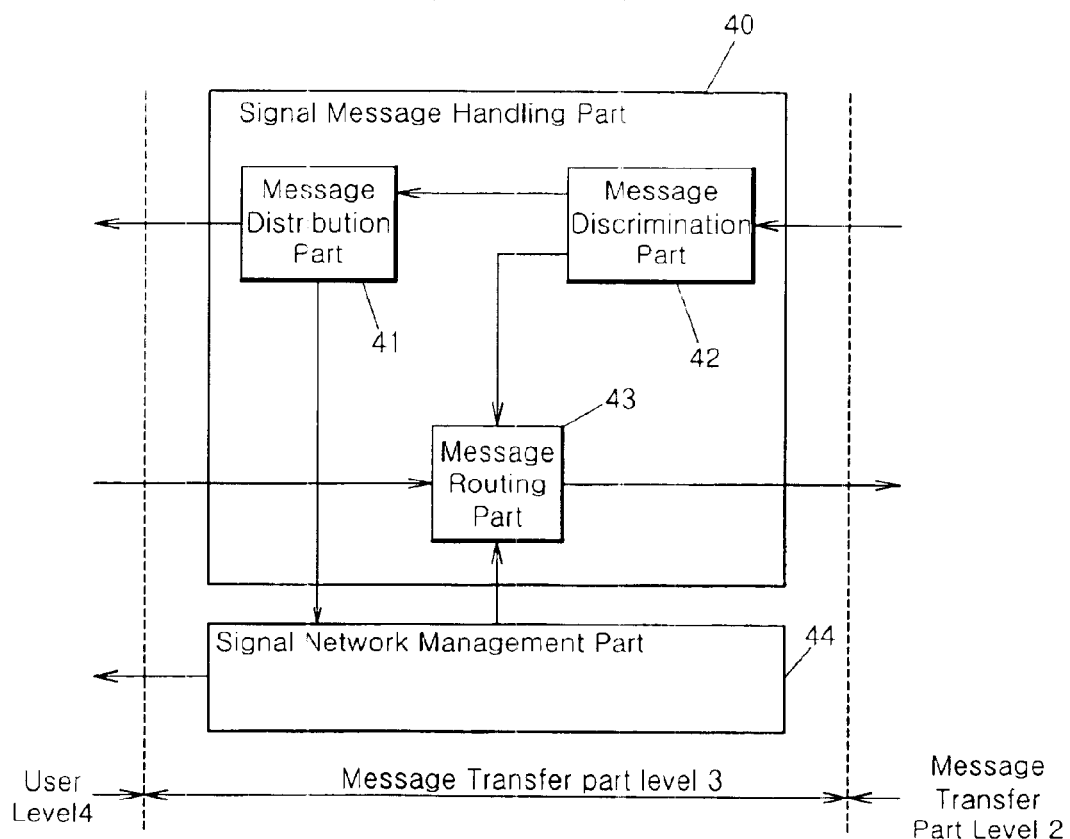
FIG. 4 illustrates the composition of the MTP level 3 of the traditional MTP protocol.
Figure 5:
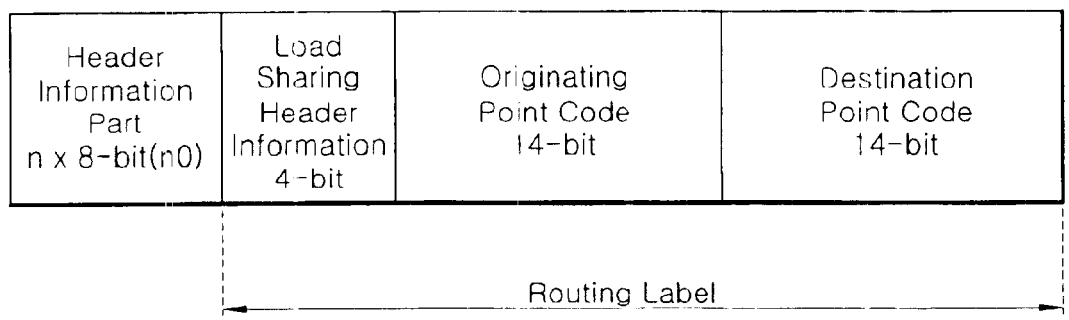
FIG. 5 illustrates the composition of the routing label information among the MTP headers.
Figure 6:
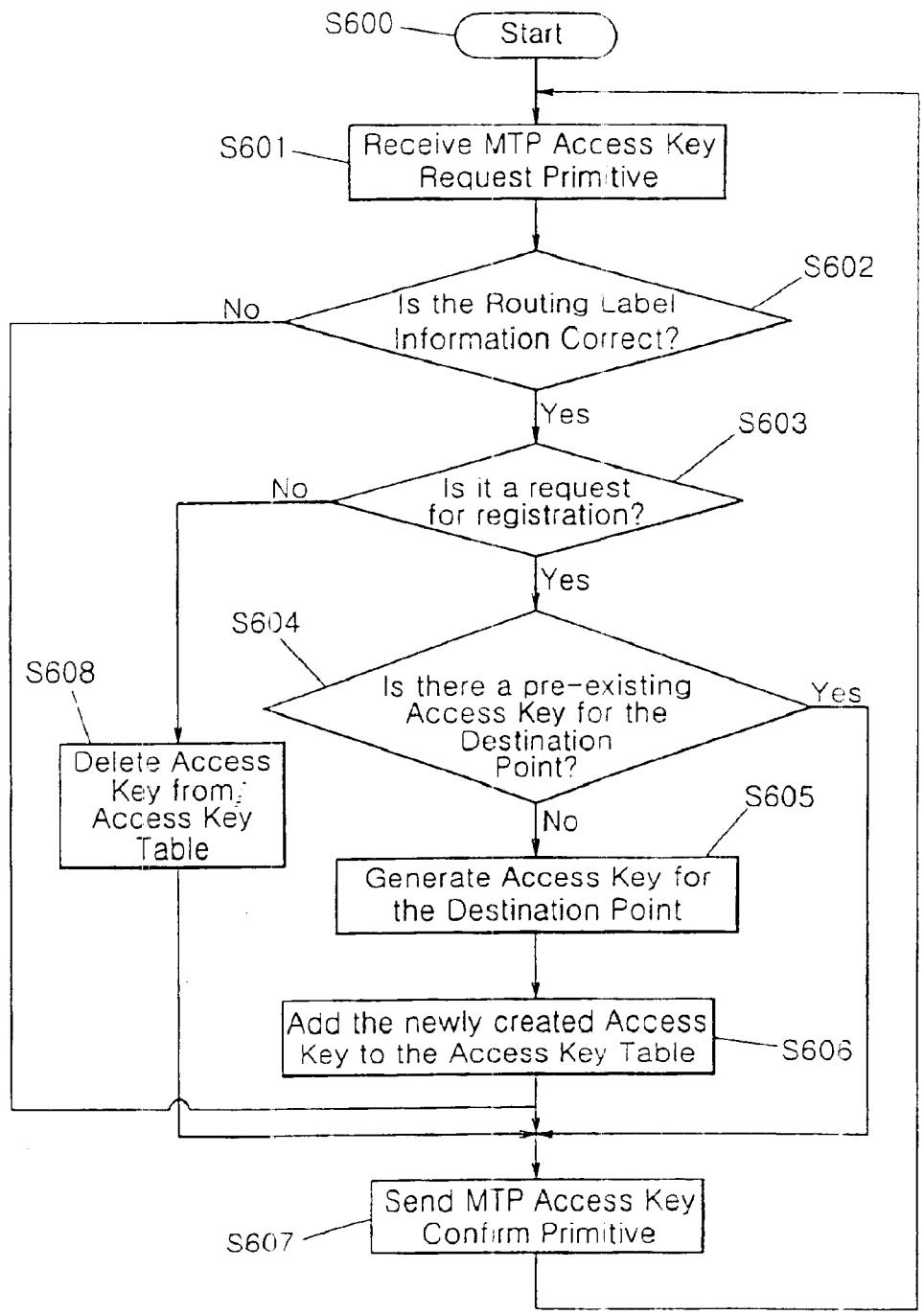
FIG. 6 illustrates a flow chart of the registration and release of the MTP access key.

FIG. 6 describes the procedures regarding the registration and release of the MTP access key as part of sending a message from the MTP user part to the destination point. For the MTP user part to use the high-speed transmission method offered by the MTP, the access key for the destination point must be registered. An access key for an applicable destination point can be registered only once.

To register the access key, the MTP user part sends an MTP access key request primitive to the MTP and the MTP receives the primitive (S601). The MTP receiving the primitive first ascertains whether the routing label information contained in the primitive is accurate or not (S602). More specifically, the MTP ascertains the signal point of the destination and originating point contained in the routing label information and then determines whether the applicable destination point actually exists and whether the service information (SIO) is normal. If the routing label information is incorrect, an MTP access confirm primitive is transmitted to the applicable MTP user part (S607). The "RSN" parameter of the confirm primitive is filled with a message indicating the failure and the reasons for the failure and the confirm primitive is subsequently transmitted. Then, the process reverts to the step (S601) of waiting for a new request primitive.

If it is determined above (S602) that the routing label information is correct, the OPR parameter determines whether the received MTP access key request primitive calls for an access key registration or access key release (S603). If a release has been requested, the existing access key in the access key table is deleted (S608). Subsequent to such deletion, a notice stating that the access key has been successfully deleted is sent to the user part through the MTP access key confirm primitive (S607). Finally, the process reverts to the stage of waiting for a new request primitive (S601).

If it is determined above (S603) that the MTP access key primitive is requesting an access key registration, the availability of the requested destination point is examined to ascertain whether there is an access key already existing for the requested location (S604). The purpose of this check is to prevent double registration at the same destination point. If an access key registration is requested despite a pre-existing access key for a requested location, such pre-existing access key value is transmitted through the MTP access key confirm primitive (S607) and the process reverts to the stage of waiting for a new request primitive (S601). If an access key registration is requested and there is no access key registered for the applicable destination point, an access key is generated for such location (S605). Then, the newly generated access key is listed in the access key table (S606). Subsequently, the transmission of an MTP access key confirm primitive is transmitted and the MTP user part is notified that an access key has been created (S607). Finally, the process reverts to the stage of waiting for a new request primitive (S601).

After registering an access key for the applicable destination point, a request to send a message to the applicable destination point is made using the registered access key (63).

Figure 7:
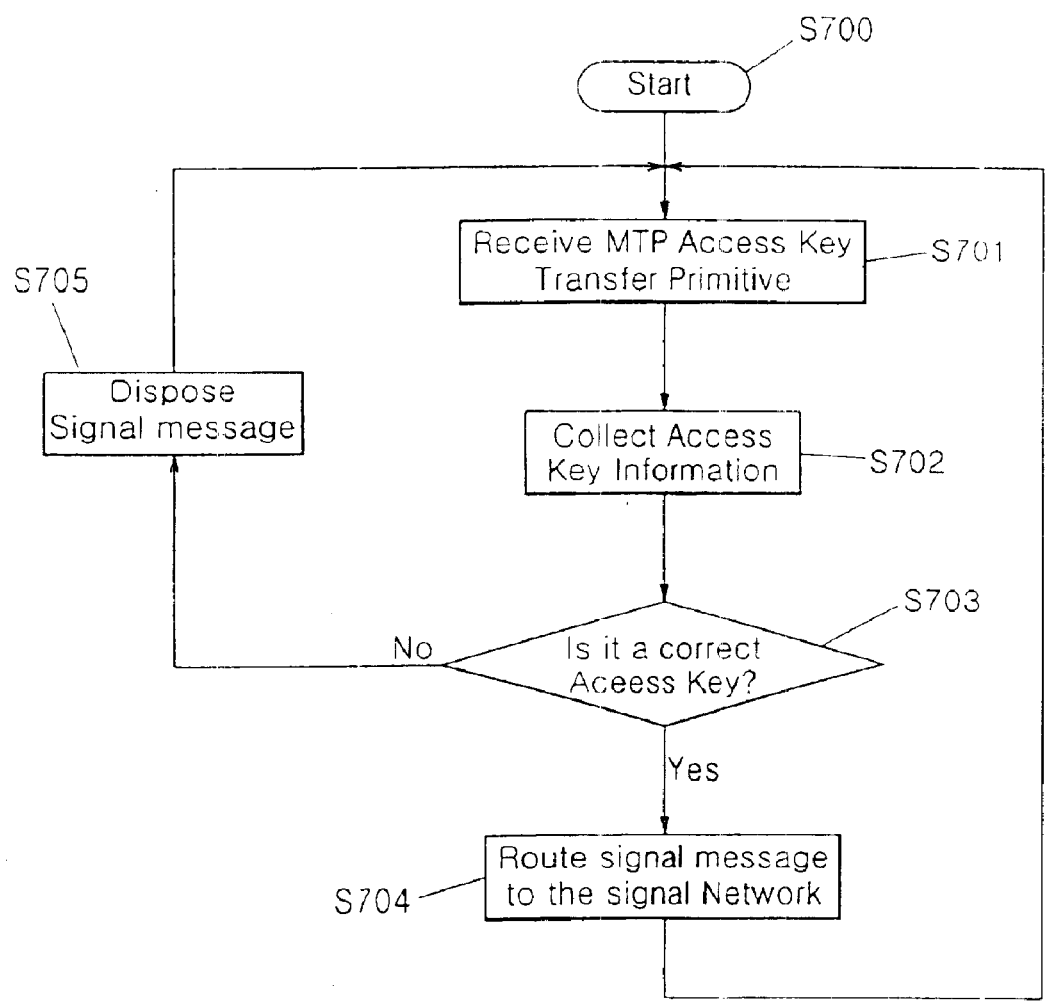
FIG. 7 illustrates the procedures regarding the processing of the signal message delivery using the registered access key.

FIG. 7 describes the procedures regarding the signal message transfer request using the registered access key. After the MTP user part has registered an access key, an MTP access transmission request primitive is sent to the MTP and the MTP receives the request (S701). The MTP receiving the MTP access transfer primitive retrieves and gathers the access key information from the primitive (S702). A search of the access key table is conducted to see if the retrieved access key information is correct (S703). According to the preferred embodiment of the present invention, in order to minimize the search time during this process, the access key table uses a Hashing Index and the MTP network management part automatically manages the accessibility status to the applicable destination point.

After searching the access key table, if it is found that routing is impossible due to an incorrect access key value, the signal message is disposed (S705). In the event the routing is found to be possible, the signal message is routed to the signal network (S704). Then, the process reverts to waiting for a new MTP access transfer request primitive (S701).

According to the Method for Transferring a Message in a Message Transfer Part with High Speed, suggested by the present invention, when routing an MTP signal message from the No. 7 signal network, there is a clear advantage in defining and applying new MTP access primitives. As a result, a high-speed transmission of a signal message from the MTP user part to the destination point can be achieved. Therefore, the present invention will minimize the time delay in transmitting messages and improve the overall message processing capabilities.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. A method of transferring a message in a Message Transfer Part (MTP), comprising:
    generating an access key table that stores status information for a destination point in an access key of the table;
    generating a content of the message in accordance with the status information; and
    transmitting the message.

2. The method of claim 1, wherein transmitting the message using the access key further comprises:
    (a) registering the access key and the status information of the destination point in the access key table at the MTP; and
    (b) determining the accessibility of the destination point based on access key information in the access key table and then transmitting the message to the destination point.

3. The method of claim 1, wherein the access key table includes an access key index field, a destination point field, an originating point field, a service information field, and a destination point status field.

4. The method of claim 2, wherein transmitting the message using the access key further comprises releasing the access key registered in the access key table.

5. The method of claim 4, wherein transmitting the message using the access key further comprises notifying an MTP user part when the access key is registered or released in the access key table.

6. The method of claim 4, wherein the registration or release of the access key is requested by an MTP access key request primitive sent from an MTP user part to the MTP.

7. The method of claim 5, wherein notifying the MTP user part of the registration or release of the access key is accomplished by an MTP access key confirm primitive sent by the MTP to the MTP user part.

8. The method of claim 2, wherein the message transmission is requested by an MTP access key transfer primitive sent by an MTP user part to the MTP.

9. The method of claim 6, wherein the MTP access key request primitive defines the destination point, an originating point, service information, information on whether the access key registration or release was successfully performed, the access key, and a reason for failure in case the access key registration or release was not successfully performed.

10. The method of claim 7, wherein the MTP access key confirm primitive defines the destination point, an originating point, service information, information on whether the access key registration or release was successfully performed, the access key, and a reason for failure in case the access key registration or release was not successfully performed.

11. The method of claim 8, wherein the MTP access key transfer primitive includes the access key and user data.

12. The method of claim 1, wherein the access key table uses the access key as a Hashing Index.

13. The method of claim 1, wherein the status information of the destination point in the access key table is automatically updated by an MTP signal network management part.

14. A method of transferring a message in a Message Transfer Part (MTP), comprising:

(a) defining an MTP access key request primitive regarding registration or release of an MTP access key, an MTP access key confirm primitive regarding confirmation of the registration or release of the MTP access key, and an MTP access key transfer primitive that sends the message;

(b) sending the MTP access key request primitive from an MTP user part to the MTP to request an access key registration;

(c) sending the MTP access key transfer primitive from the MTP user part to the MTP requesting transmission of the message to the destination point registered in the corresponding MTP access key;

(d) determining the accessibility of the destination point using access key information contained in the MTP access key transfer primitive to locate status information corresponding to the destination point within the MTP access key; and (e) routing the message to a signal network for subsequent transmission to the destination point, when the destination point is accessible.

15. A method of transferring a message in a message transfer part (MTP), comprising:

receiving an MTP access key transfer primitive that contains an access key identifier of a destination point;

determining the accessibility of the destination point using the access key identifier to locate status information corresponding to the destination point within an access key table that has a separate access key for each of a number of registered destination points; and sending the message to the destination point if the destination point is accessible.

16. The method of claim 15, wherein:

the message is sent to a destination point address contained in the access key, which corresponds to the destination point and is identified by the access key identifier.

17. A message transfer part (MTP) access primitive communicated between memory elements of a signaling system number 7 switch to increase a message transfer rate of the switch, comprising:

a destination point code field that identifies an address of a message destination point;

an originating point code field that identifies the address of a message origination point;

a service information field that identifies service information related to a message;

an operation register and release field that identifies an operation to register or release an access key in an access key table;

an access key field that identifies the access key in the access key table; and a reason field that identifies the success or failure of registering or releasing the access key and a reason for the failure to register or release the access key, if the failure occurs.

18. A message transfer part (MTP) access transfer primitive communicated between memory elements of a signaling system number 7 switch, comprising:

an access key field that identifies an access key within an access key table; and a data field containing data for transfer to a destination point, wherein an address of the destination point is contained within the access key corresponding to the destination point.

19. An access key table stored in a message transfer part (MTP) of a signaling system number 7 switch having a number of registered access keys, each registered access key uniquely identifying a destination point for a message, comprising:

an access key field that uniquely identifies the access key;

a destination point code field that identifies an address of the destination point;

an originating point code field that identifies the address of a message origination point;

a service information field that identifies service information related to the destination point; and a destination status field that identifies whether the destination point is available to receive the message.

20. The access key table of claim 19, wherein the access key is identified by a hashing code value.

* * * * *